United States Patent [19]

Devore et al.

[11] 3,800,281

[45] Mar. 26, 1974

[54] ERROR DETECTION AND CORRECTION SYSTEMS

[75] Inventors: Ernest W. Devore, Boulder; John W. Irwin, Loveland, both of Colo.

[73] Assignee: International Business Machines Corporation, Armonk, N.Y.

[22] Filed: Dec. 26, 1972

[21] Appl. No.: 317,986

[52] U.S. Cl. .......................................... 340/146.1 AL

[51] Int. Cl. .......................................... G06f 11/12

[58] Field of Search ................ 340/146.1 AL, 172.5

[56] References Cited

UNITED STATES PATENTS

| | | | |
|---|---|---|---|
| 3,418,630 | 12/1968 | Van Duuren | 340/146.1 AL |
| 3,629,824 | 12/1971 | Bossen | 340/146.1 AL |
| 3,638,182 | 1/1972 | Burton et al. | 340/146.1 AL |

*Primary Examiner*—Charles E. Atkinson
*Attorney, Agent, or Firm*—Herbert F. Somermeyer

[57] ABSTRACT

Plural error detecting and checking codes are used to check segmented data sets. A first error code checks each segment independently and has a first error correcting capability. Additionally, other error codes having a lesser error correcting capability verify proper correction of the segments on each entire data set. A segment of the data set is reserved at least in part for the other error code residues. Such other error code residues are subjected to error correction by the first error code, while the corrected error code residues verify proper correction of data and other error code residues by the first error correction code.

7 Claims, 8 Drawing Figures

ERROR DETECTION AND CORRECTION SYSTEMS

DOCUMENTS INCORPORATED BY REFERENCE

Irwin U. S. Pat. No. 3,654,617 -- an I/O control unit.

Hinz, Jr., U. S. Pat. No. 3,639,900 -- an enhanced error correction system.

Irwin U. S. Pat. No. 3,641,534 -- a magnetic recording system employing intrarecord resynchronization.

Bossen U. S. Pat. No. 3,629,824 -- an error correction system.

Irwin U. S. Pat. No. 3,624,637.

Brown U. S. Pat. No. 3,508,194 -- an error detecting system, cyclic redundancy check (CRC).

BACKGROUND OF THE INVENTION

This invention relates generally to error detection and correction systems. In particular, this invention relates to error detection and correction systems employing a plurality of error codes and as particularly applicable to those data or signal transfer systems of the block code or segment type.

The term "data set", as used herein, is relatable to a record on a magnetic tape, magnetic disk, or a plurality of computer words manipulated by a computer as one set of related data items. The term "byte" indicates a small number of bits, preferably in an ordered relationship, usually denoting a character of information. The term "segment of a data set" includes a small number of bytes arranged in any arbitrary manner for facilitating block code error detection and correction operations.

Signal transfer systems have used plural related error detection and correction schemes. For example, the Brown Pat. No. 3,508,194 illustrates a signal transfer system employing a parity error correction scheme operable on a byte of data. In addition, an entire data set or record has its error correcting capability verified by a cyclic redundancy check, as well as a longitudinal redundancy check as fully explained in the referenced patent.

The usage of plural independent error detection and correction codes is advantageous in that, for a given redundancy, a miscorrection or an error pattern falling within an undetectable portion of the error correction code is minimized.

SUMMARY OF THE INVENTION

It is an object of the present invention to provide a plural error code system which enhances error detectability and system reliability.

In accordance with the present invention, first and second error codes are provided for each data set. The first code has a greater error correction capacity than the second code. Data signals in each data set are divided into segments of a fixed number of bits and may optionally be further divided on a byte basis. The first code is applied independently to each segment to generate a separate code check bit residue or field for each segment. The second code is applied to all data signals in the data set to generate a second check bit residue or field. Then, the second code check bit residue or field is supplied as a part of, or as a segment, such that the first error code can correct errors in transmission occurring in the second code bit field or residue. The second error code residue is then used to verify the proper error correction of the first code -- both for data and second code residues.

A plurality of second codes may be provided with permutations being employed between the data signals and the various error codes to provide varying residues for enhancing the detectability of errors. Additionally, it is preferred that the "data signal to first error code" relationship be different than that of the "data signal to second error code" relationship. That is, each error code has a polynomial on which the error detection and correction operations are based. The polynomial can be related to input positions of code implementing apparatus. That is, signal arrangements within each data set are applied successively or sequentially to same or similar input positions. By applying such signals to different input positions with respect to the polynomial definition of an error code, enhanced error detection is provided.

It is an additional object of the present invention to provide an error detection system wherein the verification of error corrections, detections, and miscorrections by a first code is detected by an error corrected second code residue.

The foregoing and other objects, features, and advantages of the invention will be apparent from the following more particular description of a preferred embodiment of the invention, as illustrated in the accompanying drawing.

THE DRAWING

DETAILED DESCRIPTION

Figure 1:
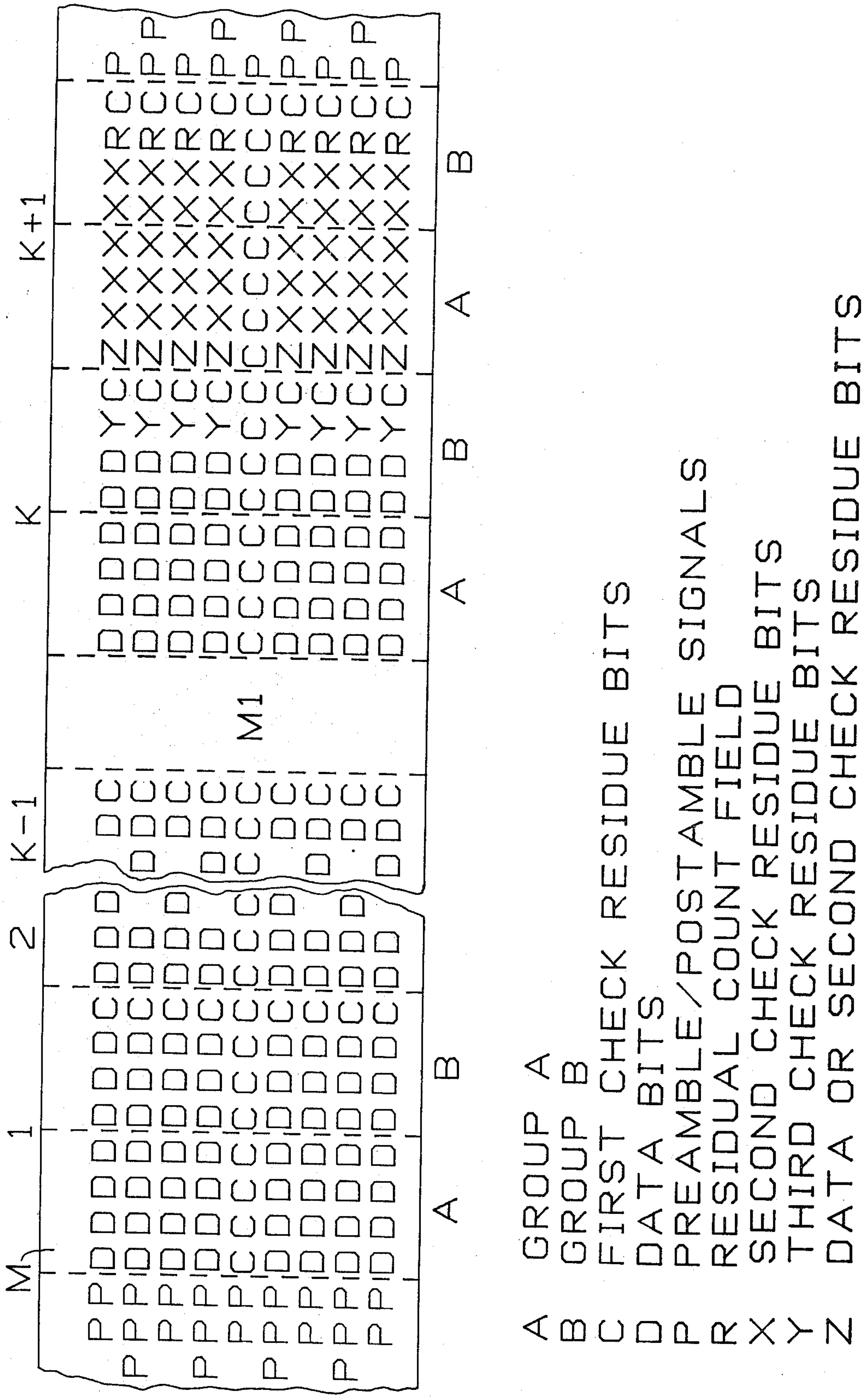
FIG. 1 is a diagrammatic showing of a data set format usable with one-half inch tape and preferred for use with the present invention.

Referring to FIG. 1, a data set arrangement for use with the present invention is shown in a magnetic tape environment as recorded on media M. The data set is bracketed on the tape by preamble and postamble signals represented by the letter P and constructed in accordance with magnetic recording techniques. The data set represented by the letter D is divided into a plurality of segments 1 through $k-1$, with a residual data segment $k$ and a check bit segment k+1. The $k-1$ and $k$ segments are separated by a marker signal group M1. A plurality of the illustrated records is recorded on a single tape or media separated by IBG's (interblock gaps), as is well known in the magnetic recording arts. For example, 158 data segments may be recorded between successive interleaved resynchronization, or resync, patterns. Such resynchronization patterns may be constructed in a similar manner to the preamble and postamble signals with suitable marker signals bracketing the resynchronization patterns. Resynchronization may be accomplished in accordance with the Irwin Pat. No. 3,641,534.

Each data segment 1 through $k$—1 is preferably arranged in bytes of nine bits across the tape. Accompanying each set of data bits is a corresponding set of check bit residues denoted by C. These check bit residues may be generated in accordance with the Bossen Pat. No. 3,629,824 or any other error detection and correction code, preferably of the polynomial type. Each of the segments 1 through $k$—1 is constructed identically with the check bit residue C operating on the associated data bits in their respective segments, in accordance with the Bossen patent. In this instance, each of the check bit residues are independent one of the other. While generating a check bit residue C, second and third check bit residues X and Y are generated for the entire record. In the illustrated embodiment, these second and third residues are generated based upon the data bits D in accordance with the Brown patent, supra. The second check bit residue checks all of the data bits in the segments 1 through k, while the third check bit residue checks the data bits in segments 1 through $k$—1 in those actual data bits and residual segment $k$, but excludes the padding bits, as will be described.

The track assignments along media M may be in accordance with ASA Standards for Information Interchange Using Phase-Encoded Recording. Each data segment is divided in Group A and Group B signals. Each group of signals consists of four data bytes and check bit bytes to be recorded. For example, each Group A consists of four data bytes, each with an associated check bit in the respective bytes. In Group B, there are three data bytes with the respective check bits, plus a full byte of check bits. For recording purposes, the four bytes of data and check bits may be converted into a storage code not pertinent to the present invention. For example, the storage code can be that described by Irwin in U. S. Pat. No. 3,624,637. Groups A and B facilitate handling the data signals, as will become apparent from a reading of the specification.

The check bit C can be 16 bits generated in accordance with Bossen's code, with eight bits being along the center track and the remaining eight bits being the check bit byte. There may be 56 data bits in each segment. The encoding of data bits with check bits and using run-length limited (RLL) coding is also shown by Hinz, Jr., in U. S. Pat. No. 3,639,900 and also shows employment of preferred readback techniques for use with the illustrated format.

Residual segment $k$ is constructed very similarly to the data segments 1 through $k$—1 insofar as the check bits are concerned. There may be from one to six data bytes in the residual segment $k$, the seventh byte being reserved for the third check bit residue Y.

If there are fewer than six data bytes to be recorded in segment $k$, the remaining byte positions can be filled with all zeroes or all ones. For example, if there is but one byte of data bits D to be recorded in segment $k$, then the first byte position will have data bits D in accordance with the received code permutations with byte positions 2–6 being filled with padding bytes (1's or 0's). The number of padding bytes in segment $k$ is indicated by the count in residual byte count R in the $k$+1 check bit segment. This count field enables a digital magnetic readback apparatus to discard the padding bits.

It may be noted that the 8-bit Y check bit residue field excludes the center track, which is filled by the check bit C. It is desired to have a 9-bit third check bit residue. This can be accomplished by substituting the check bit C for the ninth bit position of the third check bit residue. By counting the number of segments in each record, the value of the ninth bit position of the third check bit residue can be calculated. Such calculation is beyond the scope of the present application and is not further described for that reason.

Check bit segment $k$+1 stores the second check bit residue bytes X. There is but one byte generated which is repeated in the illustrated positions. Since it is desired to have odd parity across the tape, position Z (the first byte position of segment $k$+1) can be either a padding byte or a check bit byte in accordance with whether or not the check bit digit position of the second check bit residue has odd or even parity. If it is even parity, based upon the data bits and the pad bits in segments 1 through $k$, then an extra byte Z of padding signals is added. This will make the CRC residue parity odd as taught by Brown, supra. On the other hand, if the CRC residue is already odd, then the Z position is filled with a CRC byte. Segments $k$ and $k$+1 are divided into Groups A and B in the same manner as the data segments.

Figure 2:
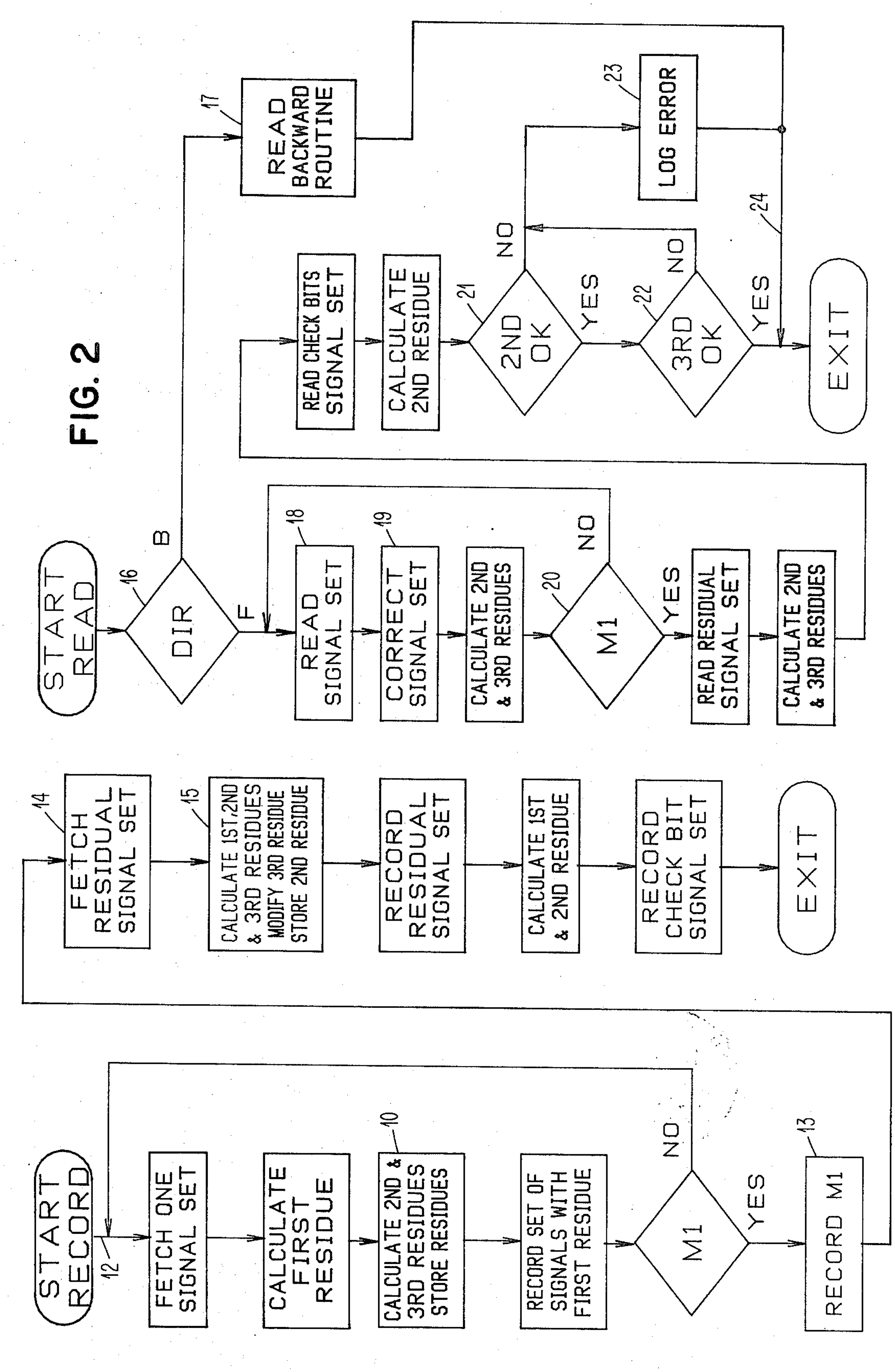
FIG. 2 is an abbreviated flowchart showing a set of operations for recording and reading back the signals in the format shown in FIG. 1.

Referring next to FIG. 2, a flowchart of all operations for employing the illustrated data set arrangement is shown. In the recording operation, the later-described record subsystem fetches one set of signals to be recorded consisting of 56 data bits. Then, the first residue C is calculated. Then, at step 10, the second and third check bit residues are calculated and stored. Then, the recording system records the set of signals with the first residue check bit C. It then determines whether or not end marker M1 is to be recorded. This is accomplished by the system detecting whether or not 56 data bits are available for recording. If such are available, then M1 is not yet to be recorded; and the flowchart loop for recording is re-entered at 12. The above procedure is repeated until the number of data bits to be recorded is less than 56 at which time M1 is recorded at 13. Then, the last two segments $k$ and $k$+1 are recorded. If 56 bits are not initially available, M1 is recorded at 13 followed by steps 14 et seq.

The residual signal set is fetched at 14 with the first through third check bit residues being calculated as afore-described. The second residue is stored at 15, while the third residue is modified in order to get proper correlation with the check bit residue C of the first error correction code. Then, segment k is recorded with the residual data bits, the padding bits, the third check bit residue Y, and the first check bit residue C. Residue C checks the residual data bits, the padding bits, and the third check bit residue C. After recording the residual signal set, the first and second check bit residues are calculated for the $k$+1 data segment. The first check bit residue checks the Z byte, the X bytes, and the residual count byte R. Then the $k+1$ segment is recorded followed by the postamble P.

In a readback operation, direction of motion is first detected at 16 to ascertain whether or not the $k+1$ segment is going to be first read, or the first segment. The read backward routine is not described, but is illustrated as block 17. It can be constructed in accordance with the showing of the readback algorithm set forth in FIG. 2 for the forward direction. In the forward direction, first a signal set is read at 18 in accordance with known techniques. In the forward direction, the first one is segment 1. The read back signals, including the D signals and the C signals, are matched for detecting errors and correcting errors in accordance with the Hinz, Jr., patent, supra. The signal set D is then corrected at 19 and supplied to a connected CPU (central processing unit). At the same time, the second and third check bit residues are calculated in the same manner as for the recording operation just described. At 20, the readback system detects whether or not the marker group M1 is being detected. If not, the loop including steps 18 and 19 is repeated until M1 group is detected. Upon detection of this group, segments $k$ and $k+1$ are read with the residues calculated as afore-described in the loop including steps 18 and 19. First, the residual signal set is read with the second and third residues calculated. Error correction is performed on the residual signal set. Then, the check byte segment $k+1$ is read with the second residue X being calculated. Following this calculation, a comparison between the calculated residues and the received check bit residues, respectively at 21 and 22, indicates any errors. If either one is in error, an error is logged at 23; otherwise, an error-free condition is represented by exiting step 22 at 24. The above-described operations are better understood by reading the following description of circuits implementing the two flowcharts.

MAGNETIC RECORDING SYSTEM

Figure 3:
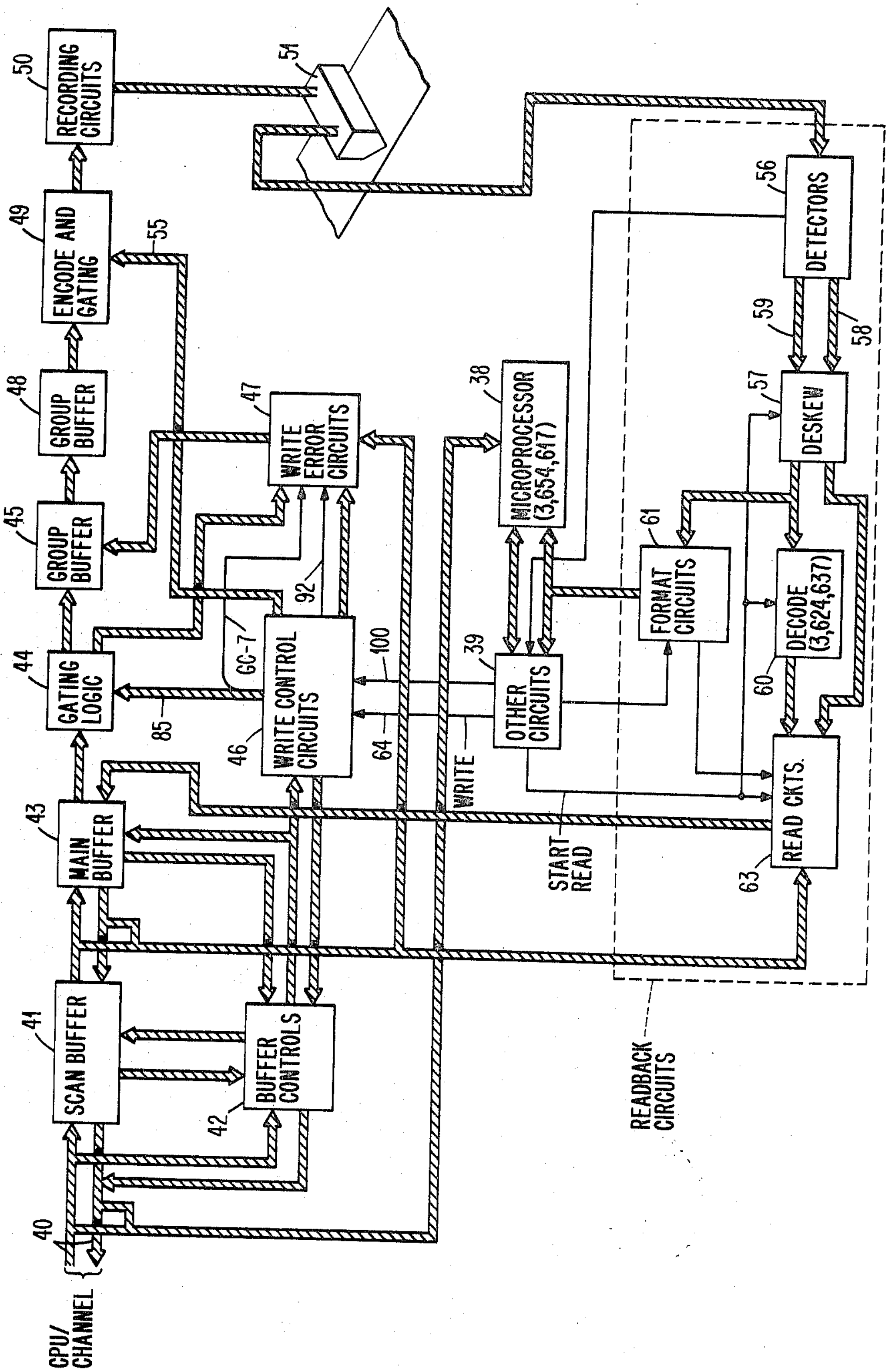
FIG. 3 is an abbreviated and simplified block diagram of a recording and readback system employing the present invention.

Referring next to FIG. 3, an I/O system for a magnetic tape recorder is shown in simplified diagrammatic form, some connections have been omitted for purposes of clarity. Such connections are ascertainable from the description of related figures. It is under control of microprocessor 38 constructed in accordance with Irwin Pat. No. 3,654,617. Additionally, other known circuits 39 in FIG. 3 are employed for sequencing controller operation in close coordination with microprocessor 38. Circuits 39 perform supervisory functions as described in the Irwin Pat. No. 3,654,617. Data is received from and supplied to a data channel or CPU via cables 40, as well as control signals between circuits 39 or microprocessor 38 as more fully described in Irwin Pat. No. 3,654,617, as well as in Moyer Pat. No. 3,303,476 and as widely used by International Business Machines in their data processing systems. A scan-in/scan-out (scan) buffer 41 provides communication between cables 40 and main buffer 43 as sequenced by buffer controls 42. The operational arrangement here is not pertinent to the practice of the present invention; however, it is described in detail later for illustrating how the invention can be practiced within a data processing system.

Main buffer 43 preferably has a capacity of about 32 bytes. It is basically a read-in/read-out count-controlled buffer wherein the modulus of the count of a readout counter termed CROC (not shown) associated with main buffer 43 forms one of the residual counts for odd/even checks. Main buffer 43 not only transfers signals to group buffer 45 for recording, but also receives data from read circuits 63 to be transferred over cables 40 to a connected CPU. Write control circuits 46 are supervised by microprocessor 38 and circuits 39 to generate the format on media M as shown in FIG. 1. Write error circuits 47 respond to signals received through gating logic 44 and the write control circuits 46 to generate error correction bits or residue such as detailed in the Bossen patent.

Figure 8:
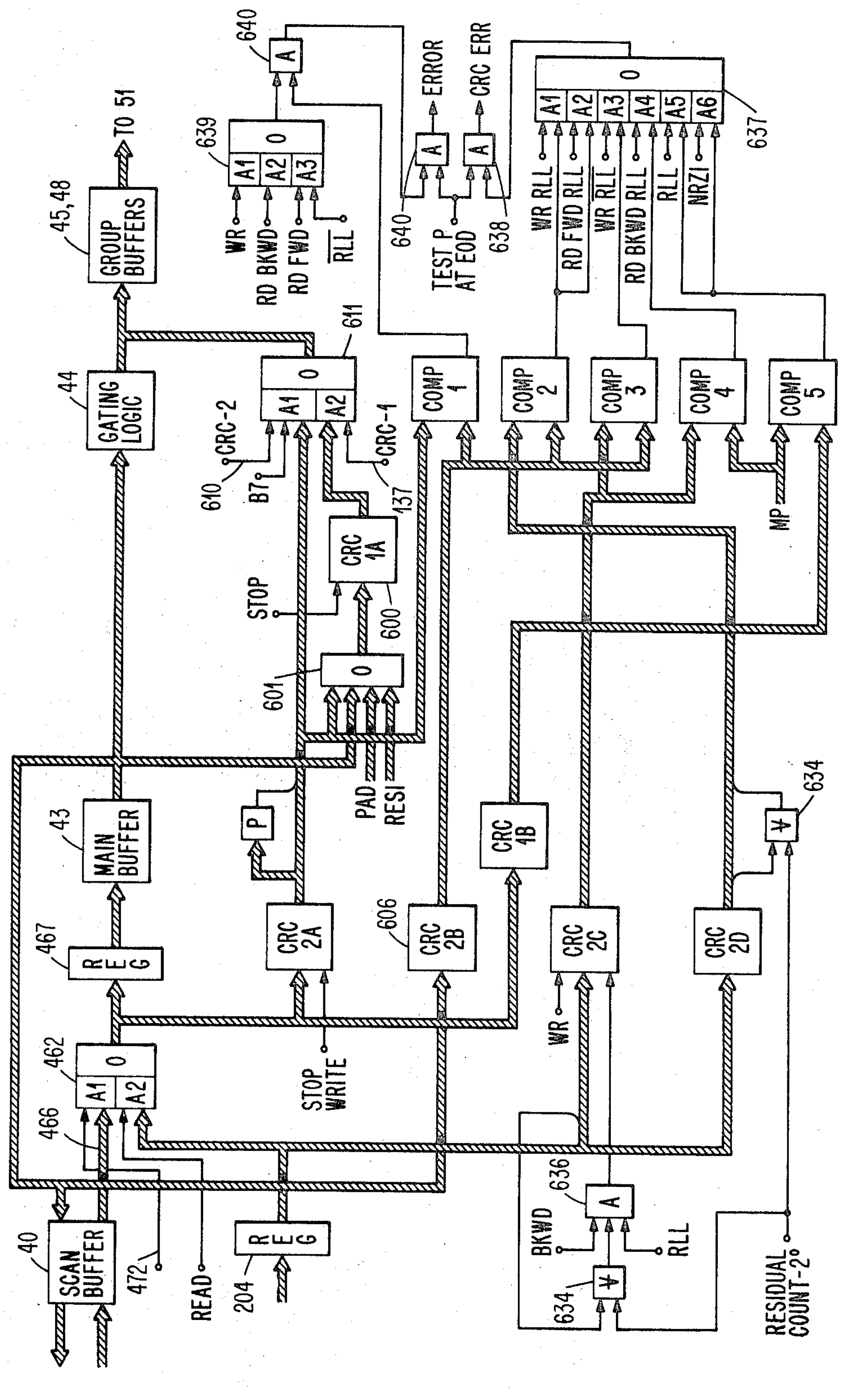
FIG. 8 is a simplified logic block diagram of error detecting codes usable for verifying proper correction by the FIG. 6 illustrated apparatus and used to verify proper error correction by the FIG. 6 illustrated apparatus.

Additionally, CRC-1 and CRC-2 check bytes are generated, as described with respect to FIG. 8 and the Brown Pat. No. 3,508,194. Four register group buffers 45 and 48 each receive groups of four bytes of data (Group A), or three bytes of data plus a check bit byte (Group B), each byte including an error detecting bit. Two groups make up one data segment. These group buffers supply the four byte groups in parallel form to encoder-gating (EG) circuit 49. The encoding portions of circuit 49 are constructed in accordance with the Irwin Pat. No. 3,624,637 for converting the four bytes of data into five-bit storage code group values, each code group value lying along one of several tracks on media M. EG 49 gates signals in a known manner for supplying serially arranged signals to recording circuits 50. Circuits 50 include the usual amplifiers and write compensation techniques, such as shown in Ambrico Pat. No. 3,503,059, and supply recording signals to transducer assembly or head 51 for recording such signals in tracks along media M.

For reproducing signals previously recorded on media M, detectors 56 receive signals from head 51. Detectors 56 include the amplifiers and read compensation, as found in known digital data readback systems. Additionally, detectors 56 generate quality of readback signals as set forth in the Hinz, Jr., Patent, supra, and supply same over cable 58 to deskewing apparatus (SKB) 57, synchronously with data signals supplied over cable 59. Deskew apparatus 57 is preferably constructed in accordance with U. S. Pat. No. 3,623,004 with accommodations being made for the record segment format of the present invention. For example, deskew apparatus 57 may include 32 registers for accommodating about three segments of storage coded signals.

Figure 4:
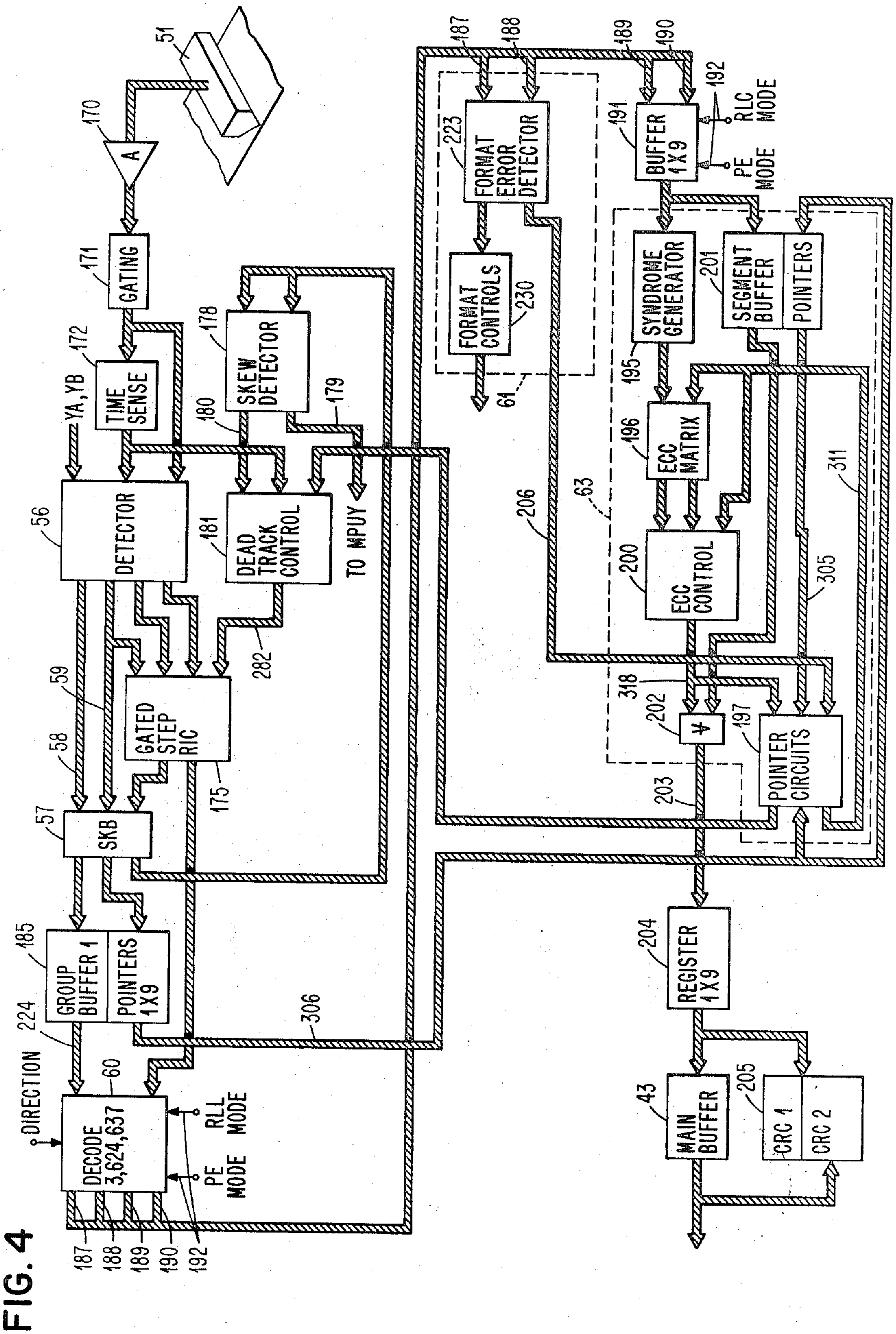
FIG. 4 is a simplified logic flow diagram of a readback system employed with the FIG. 3 illustrated recording system.

Deskew apparatus 57 supplies signals on a byte-by-byte basis to decode 60, constructed in accordance with U. S. Pat. No. 3,624,637. Quality signals are supplied directly to read circuits 63 as shown in FIG. 4. Decode 60 supplies the decoded signals of four data bytes, or three data bytes plus a check bit byte, to read circuits 63 where they are combined with the quality signals for error detection and correction purposes as detailed in FIG. 6. In the event of an improper five-bit code group being received, decode 60 also supplies a corresponding quality-indicating signal, referred to as a pointer. Additionally, format circuits 61 respond to the format group M1 for starting or stopping data signal transfers, respectively, for read backward and forward. M1 may be five successive all-1's bytes. Circuits 61 supply control signals indicating M1 to other circuits 39 and to microprocessor 38 for their supervisory action.

Read circuits 63 pass correct data signals in repeated bursts of seven bytes to main buffer 43 for retransmission over cable 40 to a connected CPU (not shown).

The special marker signals, such as M1, can be generated in write control circuits 46 (or microprocessor 38) and supplied to encoder and gating circuits 49 over cable 55. In the alternative, they may be supplied through gating logic 44 for encoding in five lengths of five-bit run-length limited code groups. It is preferred that microprocessor 38 generate such special signal groups using known computing techniques and supplying same to circuits 50. The techniques described in the Edstrom et al article "Program Generated Recording," IBM TECHNICAL DISCLOSURE BULLETIN, November 1971, Pages 1821 and 1822, are preferred to be used in this regard.

READBACK CIRCUITS

Referring now more particularly to FIG. 4, the general logic arrangement of the readback system is described with references being made particularly to other figures which detail the operation of certain portions of the readback circuits.

From transducer assembly or head 51, low-level signals are amplified by linear amplifiers 170, one for each of the nine tracks. The amplified signals received by gating circuits 171 are sensed for appropriate amplitude and then gated as hard-limited signals to time-sense circuits 172 and detector 56. The operation of circuits 171 and 172 is shown by Andresen et al in U. S. Pat. No. 3,670,304. Detector 56 corresponds to data detector 28 of that referenced patent application and is controlled in a similar manner. In addition, detector 56 selects between NRZI, PE, and run-length limited (RLL) coded detection in accordance with microprogram signals YA, YB, received from microprocessor 38 in accordance with Irwin Pat. No. 3,654,617. Detector 56 can be constructed in accordance with Vermeulen Pat. No. 3,548,327.

Detected 1's data is supplied over cable 58 to deskewing registers (SKB) 57. For each of the nine tracks, there is also a single line in cable 59 transferring pointer signals or quality signals to be deskewed in SKB 57 along with the data signals. Using the afore-described run-length limited coding, there will be five bit positions for each code group or value and a bit position for the quality signal associated with that code value as detected by detector 56. Such quality signals are those described by Hinz, Jr., U. S. Pat. No. 3,639,900 and also as described by Cannon in his article, "Enhanced Error Correction," IBM TECHNICAL DISCLOSURE BULLETIN, September 1971, Pages 1171 and 1172. SKB 57 deskews the data and pointer bits as shown in U. S. Pat. No. 3,623,004 for self-clocking systems (PE and RLL) as well as for NRZI recordings.

During the initial portion of reading a record from a magnetic tape, the preamble is first read and detected, but not forwarded through SKB 57. To detect that a preamble is coming to an end, gated step RIC circuit 175 is responsive to a string of ten 1's in any of the tracks to initiate SKB 57 operation. Detected M1 markers are inserted in the respective deskewing buffers for use by format circuits 61.

SKB 57 cooperates with skew detector 178 to detect excessive skew as defined and taught by Morphet 3,154,762. The Morphet teaching applies to phase-encoded readback and to RLL readback. Upon detection of excessive skew, detector 178 supplies sense data over cable 179 to MPUY in accordance with Irwin 3,654,617. Additionally, excessive skew signals are supplied over cable 180 to deadtrack control 181 for initiating dead-tracking as generally taught by Miller in U. S. Pat. NO. 3,262,097. Deadtrack control 181 supplies deadtrack signals to circuits 175 to block transfer of data signals read from a deadtrack. Skew detector 178 also supplies almost-excessive-skew signals in connection with error correction and detection as will be explained later.

SKB 57 deskews the RLL and PE data in accordance with known deskewing techniques. When one byte of data bits has been assembled in each of the nine tracks, a readout cycle is initiated in SKB 57. A first set of buffers, group buffer 1 (GB-1) 185, receives one group (five bytes) of deskewed storage-coded signals and associated quality signals, or hardware pointers, from SKB 57. Each time GB-1 185 is not full, it sends a request to SKB 57 for a transfer of one such byte. SKB 57 automatically responds to fill GB-1 185 in accordance with known data signal transferring techniques. It should be noted that the transfers between SKB 57 and GB-1 are independent of all other transfers in the readback system. It only requires that GB-1 be empty and SKB 57 has assembled and deskewed one group of storage-coded signals.

The storage-coded signals are then converted from the five-bit RLL storage code format to four-bit data processing coded groups, which include check bits. GB-1, when full, supplies one group of signals from each of the nine tracks to decode 60. Decode 60 has one decoder for each of the nine tracks conveniently constructed in accordance with U. S. Pat. No. 3,624,637. Decode 60 has four groups of outputs. First are the detected format markers, such as M1, which are supplied over cable 187 to format circuits 61. Second cable 188 transfers signals indicating that an illegal RLL code value has been decoded. This nine signal path cable connects to format detector 61 and eventually provides error signal pointers to error correction circuits 63. The other two cables 189 and 190 carry decoded data from either the RLL or PE recordings through single-byte buffer 191. The cable is selected in accordance with the control signals received over lines 192 from microprocessor 38. In the RLL mode, the decoded bytes are byte serially transferred through cable 189 as four byte signal groups.

The detected and decoded format groups result in control signals from control 61, not pertinent to the present invention. The decoded data transferred through buffer 191 is then error corrected by read circuits 63 as detailed with respect to FIG. 6. For the present, buffer 191 supplies the decoded data on a byte-by-byte basis for each segment to syndrome generator 195 which generates S1 and S2 error-indicating syndromes. ECC matrices 196 jointly respond to the S1 and S2 syndromes, plus the data and pointers from pointer circuits 197, to generate error-pointing patterns for ECC control 200. The decoded data from buffer 191 also is transferred through segment buffer 201 and is stored there during the error detection and correction operations of syndrome generator 195, ECC matrices 196, and ECC control 200. Exclusive OR circuits 202, one circuit for each track, are jointly responsive to the error patterns from ECC control 200 and the data synchronously supplied from segment buffer 201 to supply correct data signals over cable 203 to ECC output byte buffer or register 204. Later-described sequence controls (FIG. 5) request seven consecutive write cycles from main buffer 43. At this time, segment buffer 201 and ECC control 200 serially and synchronously transfer seven bytes of error patterns and data signals through Exclusive OR's 202 and register 204 to main buffer 43, as will be detailed later. These signals are also applied to CRC circuits shown in FIG. 8 and as represented in FIG. 4 by box 205.

Returning now to pointer circuits 197, these circuits receive pointer signals from segment buffer 201 over cable 305 which resulted from detector 56 operation, from the RLL error detector in circuits 61 over cable 206 which indicate an illegal code value, from ECC control 200 indicating that a particular track has been corrected, or from GB-1 185. Based upon these inputs, pointer circuits 197 generate categories of pointers useful in error detection and correction as well as in deadtrack control. Generally speaking, pointer circuits 197 establish hierarchies of quality or pointer signals which, when positively indicating an error, are supplied as such to ECC matrix 196. If an error condition persists, a persistent pointer is generated and supplied to deadtrack control 181. In some instances, detector 56 generates pointer errors supplied over cable 59 and thence transferred to segment buffer 201. This may indicate a possible error condition with detector 56 correctly detecting the data. In such a case, pointer circuits 197 memorize that a pointer has been generated, such pointers are ignored by circuits 196, 200 until an error condition has been verified. For pointer utilization, see Hinz, Jr., patent, supra.

Figure 6:
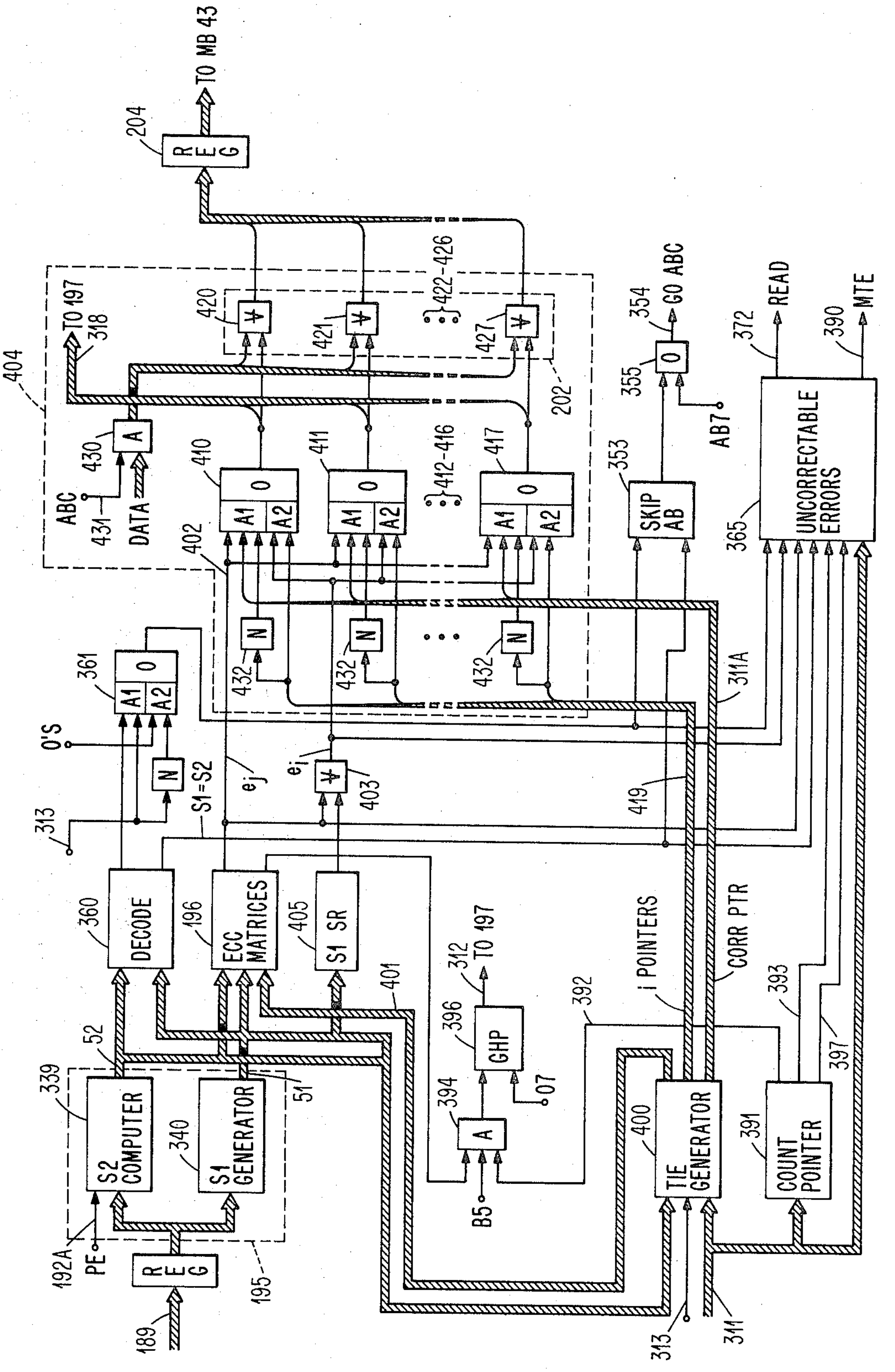
FIG. 6 is a simplified diagram of a first error correction code apparatus.
Figure 7:
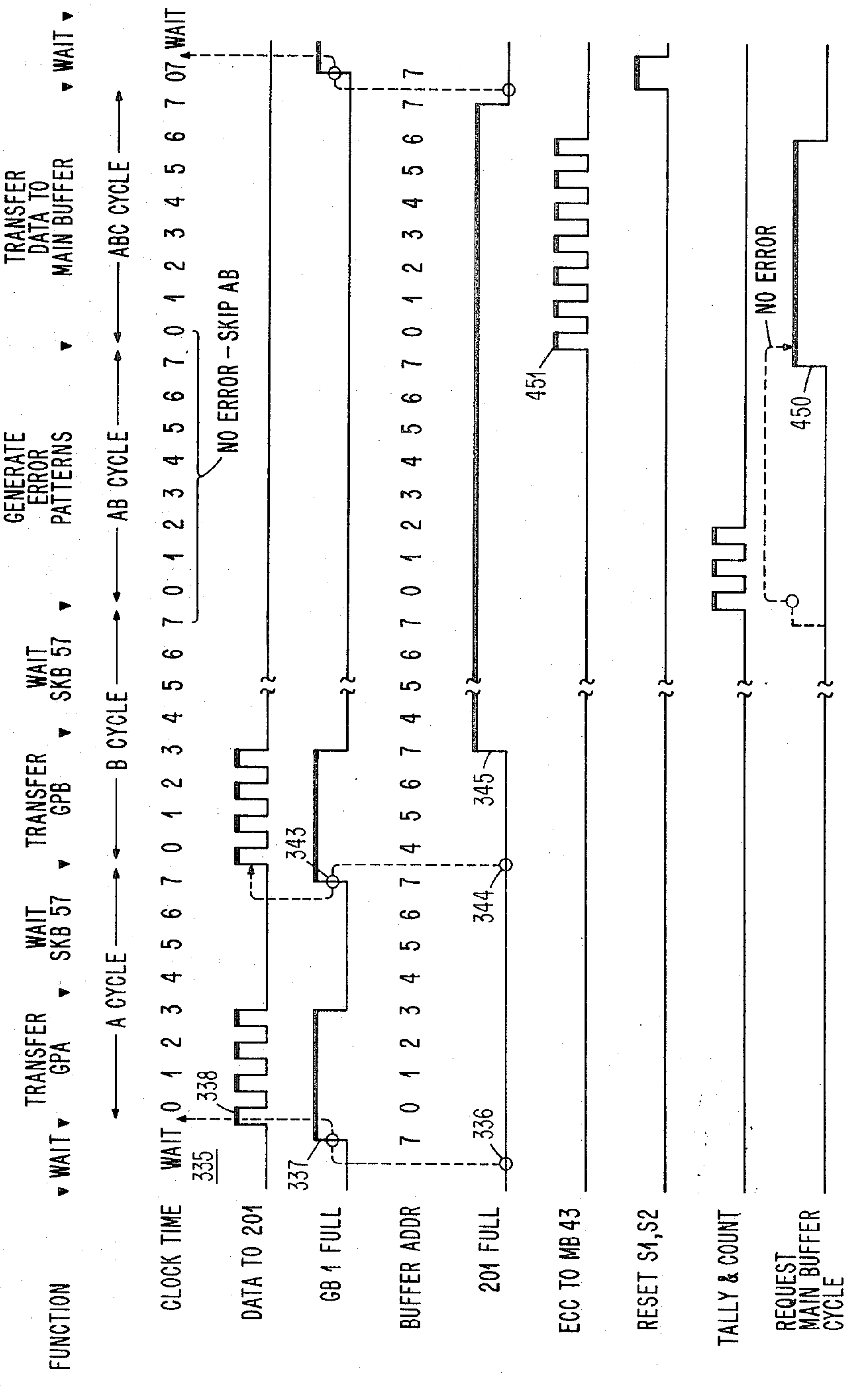
FIG. 7 is a timing diagram used to explain the operation of the FIG. 6 illustrated apparatus.

Timing of the FIG. 4 illustrated circuits will be described in detail with respect to FIGS. 6–8, and particularly as shown in FIG. 7. Readback operations include four types of cycles while processing signals. Each cycle consists of eight steps enumerated 0–7. Each step is divided into first and second portions, a first portion for transferring data signals and a second portion which sets up control circuits for operations in subsequent cycles. Outside of the cycles there are wait periods during which no synchronous signal processing operations occur with respect to buffers, error correction, and the like, even though recording and other readback circuits may be active at this time. Of the four cycles, two cycles (the A cycle and B cycle) transfer, respectively, groups of signals between buffers GB-1 and segment buffer 201, the A cycle transferring Group A of each segment and the B cycle transferring Group B of each segment. Format groups are always transferred during an A cycle. The third cycle, the AB cycle, controls the operation of the error correction circuits shown in FIG. 6. If there are no errors in the data, cycle AB is omitted. If there is an uncorrectable error, the readback operation is stopped. The fourth cycle, ABC, transfers one segment of seven bytes of data signals from error correction circuits 63 over cable 203 to main buffer 43.

TIMING AND SEQUENCE CONTROL

Figure 5:
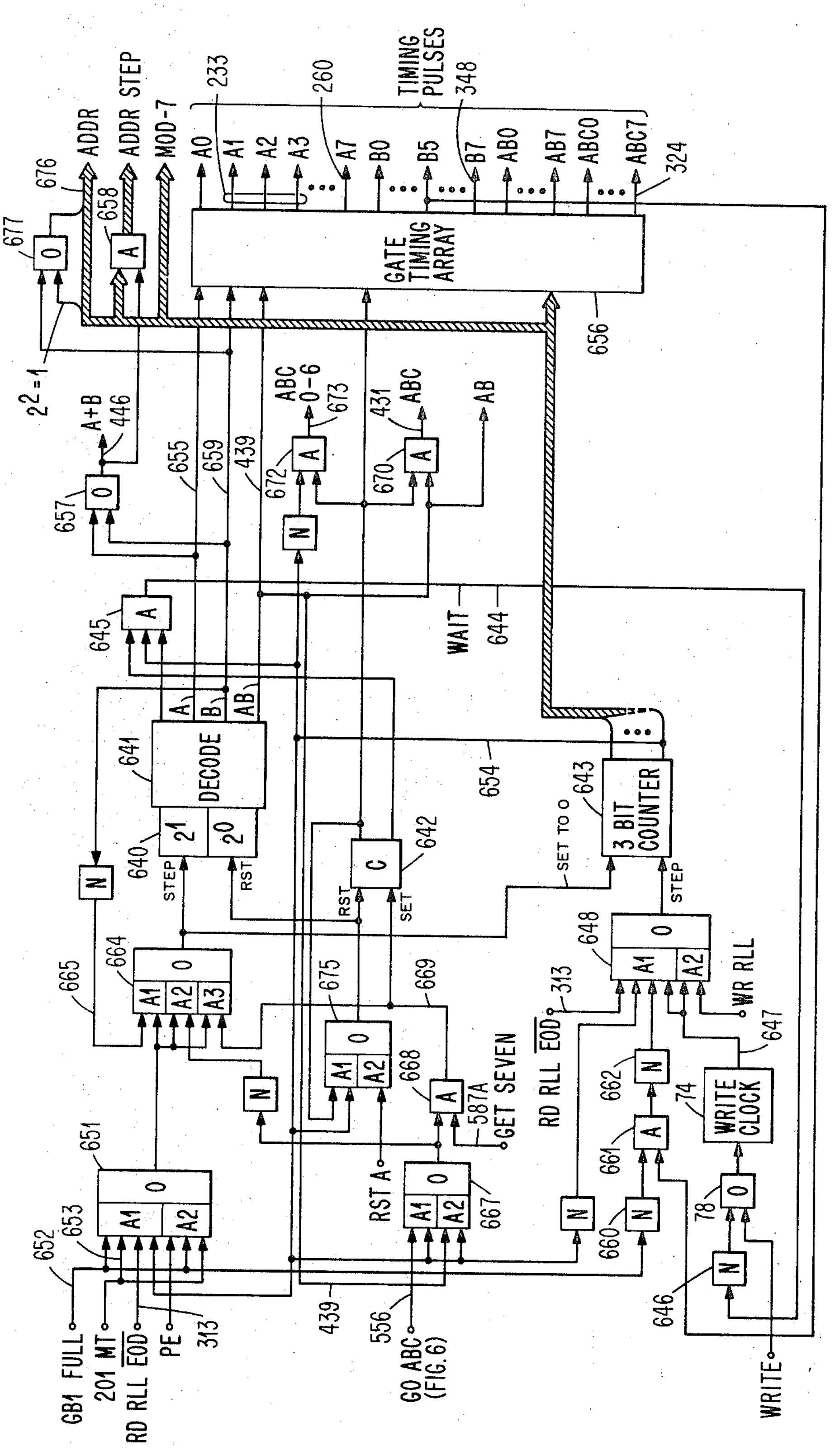
FIG. 5 is an abbreviated block diagram of a timing control usable with the other illustrated apparatus of the present application.

Referring now more particularly to FIG. 5, the generation of cycles A, B, AB, and ABC is described in simplified flowchart form. The cycle controls reside in a modified three-bit counter consisting of two-bit counter 640 with decode 641, plus C latch 642. When counter 640 is in the all-0's state, C latch 642 is reset, and three-bit counter 643 is in the seven state, wait signal 335 (FIG. 7) travels over line 644 from AND circuit 645. Wait signal 335 disables clocking circuits used to step sequences A through ABC. In the present embodiment, oscillator 74 provides the timing for readback operations. When AND 645 supplies wait signal 335 through inverter circuit 646, thence OR 78, write clock 74 is disabled. When AND 645 is inactive, inverter circuit 646 activates clock 74 to supply timing pulses over line 647 to A-O 648. A-O 648 selectively gates the timing pulses, as will become apparent, to step three-bit counter 643 through its eight states, 0–7.

Operation of the FIG. 5 illustrated circuits is initiated by A-O 651. The A1 input portion initiates one timing cycle in joint response to GB-1 185 being full and segment buffer 201 being not full, respectively indicated by signals from those buffers on lines 652 and 653, and as described with respect to FIG. 7, together with the processor 38 signal on line 313 and the three-bit counter 643 count-equals-seven signal on line 654. A1 then supplies a step pulse to counter 640 incrementing it to a 01 state indicating the A cycle of FIG. 7. This action corresponds to and indicates implementation of the signal conditions at numerals 336, 337, and 338 in FIG. 7. AND 645 removes the wait signal thereby enabling write clock 74 to supply stepping pulses to three-bit counter 643. Simultaneously with stepping counter 640, the stepping pulse from A-O 651 also sets three-bit counter 643 to the all-0's state for generating sequence pulse A0. Precise timing of the timing pulses from clock 74 will vary as it has a resynchronous delay therein to ensure full energy timing pulses to be supplied to A-O 648. Such resynchronous delays are so well known they will not be further described.

Decode 641 responds to the counter 640 01 count condition to supply an A cycle indicating signal over line 655 to gate-timing array 656. Gate-timing array 656 combines the A signal with the three-bit counter 643 output timing pulses to generate pulses A0 through A7, as is well known in the data processing arts. Additionally, A signal travels through OR circuit 657 to be combined with the later-described B signal to supply an A or B signal over line 446 to FIG. 6 illustrated circuits. Additionally, the A or B signal on line 446 enables AND circuits 658 to supply address step signals 0 through 7 for address selection in GB-1 185 and segment buffer 201 as referred to with respect to the description of FIG. 4.

A-O 648 passes the write clock timing signals from line 647 whenever three-bit counter 643 is not in the seven state, and the readback control signal on line 313 indicates run-length limited readback and end of data has not been detected. The A2 portion is used during recording of RLL data to step the readback circuits in a read-after-write recording verification.

Upon completion of the A cycle as described with respect to FIG. 7, counter 643 again reaches the seven state, supplying its de-activating count-7 signal over line 654. This degates A-O 648 preventing further stepping counter 643 until A-O 651 again steps counter 640. This action corresponds to the wait period of FIG. 7 at timing period A7. Again, when GB-1 185 is full and segment buffer is not full, as shown at 343 and 344 of FIG. 7, a second stepping pulse leaves A-O 651 incrementing counter 640 to 10 and resetting counter 643 to 0's. Decode 641 then supplies the B signal over line 659 to gate-timing array 656 for combination with the timing pusles from counter 643 for generating pulses B0 through B7. A-O 648 is again activated to pass write clock 74 timing pulses to step counter 643.

From FIG. 7, it will be remembered that B5 is also a wait period for hardware pointers or quality signals to be used with error correction. Such pointer signals travel with associated data readback signals from SKB 57 to GB-1 185. Therefore, the wait at B5 continues until GB-1 185 signals over line 652 it has received the data and pointer signals. NOT 660 inverts the line 652 signal to activate AND 661 with the B5 signal for degating A-O 648 via NOT circuit 662. When line 652 carries the GB-1 full signal, AND 661 is degated to end the B5 wait period.

At the end of the B cycle, at B7, depending upon the syndromes supplied by S2 computer 339 and parity generator 340, either the AB cycle or the ABC cycle is entered. The AB cycle, error correction cycle, can be entered irrespective of the ability of main buffer 43 to receive seven bytes of data. On the other hand, if the ABC cycle is to be successfully entered, main buffer 43 must have at least seven registers available for receiving data bytes through register 204 from the error correction circuits. If seven registers in main buffer 43 are not available, an overrun error is signaled by alarm circuits (not shown). By design choice, the ABC cycle may not be inhibited thereby allowing the ABC cycle to transfer seven bytes with any overrun being detected by main buffer 43 circuits.

A-O 664 controls cycle stepping and initiation to accommodate the above requirements. The A1 input portion is jointly responsive to the A-O 651 step pulse and the NOT-B signal on line 665 to allow stepping counter 640 to the A and B cycles as described above. The A2 portion of A-O 664 is jointly responsive to the A-O 651 step pulse and a later-described signal indicating not going to the ABC cycle to supply a step pulse to counter 640. This step pulse does not travel to C latch 642, leaving that reset. Accordingly, decode 641 responds to the 11 count state of counter 640 to supply an AB pulse over line 439 to gate-timing array 656 for generating timing pulses AB-0 through AB-7 and also supplying the AB signal to FIG. 6.

The ABC cycle must be entered either from the B cycle or the AB cycle. A-O 667 determines when the ABC cycle should be entered. It is responsive to the GO ABC signal on line 556 from FIG. 6 to supply an activating signal to degate the A2 portion of A-O 664 as well as partially enable AND circuit 668 in preparation for the ABC cycle. The A2 portion of A-O 667 is jointly responsive to the AB signal on line 439 (error correction cycle) and the three-bit counter 643 equal to seven to supply the ABC activating signal. AND 668 inhibits initiation of the ABC cycle until main buffer 43 is ready to receive seven bytes of data. In this regard, buffer controls 42 supply a "get seven" signal over line 587A to enable AND 668 to supply a stepping pulse for initiating ABC over line 669. For the design choice mentioned above, AND 668 is dispensed with to allow ABC cycle irrespective of main buffer 43 operation.

The ABC stepping or initiating signal sets C latch 642 and simultaneously completes the activation of the A3 input portion of A-O 664 to step counter 640 from the B state (10) to the AB state (11). Counter 640 in the 11 or the AB state and latch C being active indicates the ABC cycle. AND 670 combines the AB signal on line 439 and the C latch 642 active signal to supply an ABC signal over line 431 to circuits 404 in FIG. 6. Additionally, ABC timing pulses 0–6 transfer data from segment buffer 201 to error correction Exclusive OR circuits 202 (FIG. 6 circuits 420-428), thence to register 204 and main buffer 43. The ABC 0–6 indicator signal on line 673 is generated by AND 672 in response to the C signal on line 674 and the NOT-7 signal generated based upon the counter 643 K=7 signal. The latter may be replaced by the gate-timing array timing pulses ABC 0–6.

At the end of the ABC cycle, FIG. 5 circuits are reset to enable a new A cycle to be initiated. A-O 675 A1 portion is jointly responsive to C latch 642 active signal on line 674 and counter 643 K=7 signal on line 654 to reset C latch 642 and counter 640.

The buffer addresses used in A and B cycle described with respect to FIG. 7 are also generated by three-bit counter 643. It will be remembered that each group of data signals is transferred during timing periods 0–3 respectively of the A and B cycles. The data bytes transferred during A0 through A3 reside and are stored in buffer registers having addresses 0–3. However, during the B cycle, the four data bytes being transferred should be fetched from and stored in buffer registers having the addresses 4–7 and be transferred during cycle pulses 0–3. Three-bit counter 643 supplies its signals as the buffer address over cable 676 to buffer controls 42. Additionally, the digit position $2^2$ is supplied to OR circuit 677. OR circuit 677 combines the B signal on line 659 with the three-bit counter 643 signal $2^2$=1 to provide the addresses 4–7 during the first four cycles 0–3 of each B cycle. The $2^2$ bit position of counter 643 equals 0. By supplying the B signal through OR 677, it appears as a 1 and, hence, the addresses are shifted from 0–3 to 4–7.

ERROR DETECTION AND CORRECTION

The error detection and correction system employs a plurality of independent, but interacting, error detection and correction codes. It is preferred that the polynomials and the interrelationships of each polynomials with the data bits being processed exhibit bit permuted relationships for enhancing the probability of detecting 100% of the error conditions while correcting a high percentage of detected errors. Within the present concepts, any one of a plurality of error detection and correction codes may be employed. The selection of a particular code polynomial and a particular set of companion matrices associated with such polynomial should be in accordance with the error characteristics of the signal transfer system being employed. Considerations should also be employed for making compatibility of the circuitry utilized to effect error detection and correction with previous systems. For example, in magnetic media recording systems, parity has been used for years to detect errors in bytes of data recorded transverse to the tape length. In a multitrack system, with track in error pointers, such a parity system can correct one track in error. For purposes of economy, it is desired to retain parity systems for transversely recorded data bytes in magnetic tape systems. Such parity is encoded as described for the data segments; hence, will not appear as parity on the tape. When employing the invention in other systems, such a restriction need not be applied. Since the first constructed embodiment of the present invention was in the one-half inch magnetic tape environment, the error correcting codes used with each data segment retained the vertical redundancy check (VRC), or parity, associated with prior one-half inch tape reording systems such as PE and NRZI systems. In this regard, syndrome S1 (later referred to) may correspond to VRC of prior systems. Such selection facilitates constructing a magnetic recorder and readback system which may process signals in either the NRZI, PE, or the present RLL data format with a minimum of additional circuitry. See copending commonly assigned patent application, Ser. No. 306,975, filed Nov. 15, 1972, by A. Patel et al.

Other error correction codes may be used. For example, Bossen Pat. No. 3,629,824 teaches that selecting all check bits from the Galois field $2^B$ and with the use of pointer signals as taught by Hinz, Jr., in U.S. Pat. No. 3,639,900, two tracks in error can be corrected. Use of the Bossen code, wherein track 8 aligned check bits are selected from the Galois field $2^B$, does not necessarily ensure compatibility with prior systems; i.e., it may not be odd parity.

In a magnetic record tape system, wherein forward and backward reading is employed, it is preferred that the polynomial be of the symmetrical type, such as that used in the cyclic redundancy checks set forth in U. S. Pat. Nos. 3,508,194, 3,508,195, and 3,508,196.

Each data segment has errors detected and corrected by either of the above-referred-to or other suitable error detection and correction codes which are selected in accordance with the teachings by W. Wesley Peterson in his book, ERROR CORRECTING CODES, MIT Press 1961, LC Card No. 61–8797. In addition to the segment error detection and correction, there are two cyclic redundancy checks (CRC's) as taught in the above-referred-to U.S. Pat. No. 3,508,194 and shown in FIG. 8. The CRC check bytes are generated based upon the data bits as they are transferred from main buffer 43 to group buffer 45. In the present embodiment, the polynomial check bytes in the data segments are not checked by these CRC's. It is also preferred that each CRC check byte be a symmetrical polynomial as used in standard nine-track NRZI recording. In this manner, the same circuitry, i.e., the same linear shift register, can be used to generate the CRC as used for nine-track NRZI recording. Because the CRC is so well defined, it will not be further described, it being understood that write error circuits 47 (FIG. 3) employ such CRC circuitry; and, in addition, read error circuits 63 also employ a similar set of circuits (not shown) for detecting errors in the record block. The interaction of such codes is described with respect to FIG. 8.

Both the CRC and the check bits used for the data segments are preferably based upon symmetrical polynomials. In processing large amounts of data, it has been observed that a small number of miscorrected errors from a data segment is not necessarily detected by the CRC check byte. The reason for this is the mathematical operations on the data are sufficiently similar that the undetected errors reside in the same portions of the relative error detecting fields of the two polynomials. Accordingly, it is desired to vary the relationships between the polynomials and the data in the data segments with respect to the CRC polynomials and ECC polynomial to take a greater advantage of the redundancy of the check bits. This variation is referred to as track-polynomial rotation or scrambling. Any permutation may be selected in accordance with failure mode analysis and particular ECC characteristics. Any selection is suitable and not pertinent to the practice of the present invention.

While the interrelationship of CRC-1 and the ECC codes is enhanced by this track-polynomial rotation, less than 100% of miscorrections and errors in large amounts of data may still not be detectable by that combination. So, in addition, a second CRC, CRC-2, which uses the same polynomial as CRC-1 (no limitation thereto intended), but having a different track-to-polynomial relationship, i.e., a further polynomial rotation, provides added redundancy. Further enhancement is provided by assigning a different subset of data signals in the record to CRC-2 than was assigned in CRC-1. For example, CRC-1 during recording, is driven by the data and padding signals as transferred to group buffer 45. CRC-2 on the other hand can be driven only by the data signals. The readback portion decode 60 supplies all of the data signals plus the padding signals to read error circuits 63. Readback circuits 63 separate the padding signals from the true data signals.

The data segment error detection and correction is further described with particular references to FIGS. 6 and 7. FIG. 7 illustrates the timing relationship for a read forward of all signal transfers through circuits 63. Read forward means the tape is moving in the same direction as it moved during recording. Read backward means the tape is moving in the direction opposite from the direction of motion during recording. All described readback operations are read forward.

Readback is timed by four timing cycles (FIG. 7); A cycle, B cycle, AB cycle, and ABC cycle. The A cycle transfers Group A and format groups from five register GB-1 185 (FIG. 4) through decode 60 to segment buffer 201 via register 191. B cycle transfers the Group B data signals through decode 60 into segment buffer 201. Syndrome generator 195 may generate S1 and S2 during these transfer cycles. Upon completion of such transfers, segment buffer 201 contains one data segment, together with the ECC or check bits. At this time, syndrome generator 195 has detected whether or not there are any errors in the data segment. If there are no errors, the AB cycle is omitted with the timing directly entering the ABC cycle which transfers data signals from segment buffer 201 through Exclusive-OR's 202, thence to main buffer 43. If errors are detected, and are correctable, then the AB cycle is performed for error correction calculations (error correcting signals are generated). Upon determining which bits are in error, ECC control 200 actuates Exclusive-OR's 202 during the ABC cycle to selectively change ones and zeroes of the data bits from buffer 201 during the transfer to main buffer 43; that is, which bits to correct is determined during the AB cycle, while the actual correction is performed during signal transfers in the ABC cycle. If more than two tracks are in error, either the readback operation may be aborted or single TIE operations may be employed. In this situation, CRC-1 and CRC-2 are relied upon to detect possible miscorrected errors.

Since the operation of the error correction circuits and buffer transfer circuits is usually designed to be faster than the maximum data transfer into SKB 57, there is usually a wait period 335 (FIG. 7) before an A cycle is initiated. During this period of time, there is no signal transferring between SKB 57 and main buffer 43. Each A cycle is initiated by the circuitry of FIG. 5;

however, for the present description wherein segment buffer 201 is empty as at 336 and GB-1 185 is full as at 337, an A cycle is initiated. It may be remembered that decode 60 has its output signals commutated on a byte-by-byte basis for four bytes. The four data bytes are transferred during periods 0-3 of the A cycle by data transfer pulses 338. GB-1 185 full signal remains active until the last byte, i.e., the fourth byte, of Group A is transferred during period A3. Note that GB-1 185 has five 9-bit registers which simultaneously supply 45 signals to decode 60. Operations are timed by the 4-byte decoded signal transfer from decode 60 to register 191. Since the A cycle is already initiated, periods 4–7 constitute a wait period for SKB 57 to assemble Group B signals. Also, period A7 may be followed by a wait period (not shown). In FIG. 7, the buffer addresses referred to are the register addresses for segment buffer 201.

Turning now to FIG. 4, register 191 receives one byte of data and transfers it to syndrome generator 195 (FIG. 6). Syndrome generator 195 may have S2 computer constructed similarly to the S2 computer 339 shown in the Bossen Pat. No. 3,629,824. This computer calculates error syndromes (including track-in-error idicators) in accordance with the selected polynomial represented by the check byte in byte position C. The same bytes are supplied to generator 340 for generating the S1 syndrome. In Bossen, supra, the VRC of previous systems is not used; while in Patel, supra, the VRC of previous systems is used. Hence, in A cycle, the A group signals are processed by circuits 63 to partially calculate S2 and S1 for the record signal segment.

Steps 4–7 are wait steps, with period 7 being maintained until Group B signals have been assembled by SKB 57.

Let it be assumed that A cycle has reached period A7. GB-1 full signal becomes active again at 343 while segment buffer 201 remains not full at 344, it being remembered that segment buffer 201 has the capability of storing one data segment including the check byte before becoming full. This coaction initiates the B cycle. FIG. 5 apparatus switches from A to B as described. During periods 0–3 of the B cycle, the four decoded bytes of data from decode 60 ae transferred into registers 4, 5, 6, and 7 of segment buffer 201 from the five registers 0–4 of the GB-1 buffer 185. GB-1 full signal remains active until the completion of the transfer of the last byte of data. B periods 4–7 are wait periods.

Since one data segment has been transferred into segment buffer 201, the segment buffer full signal becomes active at 345 as described in more detail with respect to FIG. 5. Segment buffer address in the B cycle is changed from 0–3 to 4–7 by adding the B cycle signal in with the addresses for forcing the $2^2$ digit position to a 1. Accordingly, as described, the segment buffer address 4–7 is repeated twice during the B cycle.

The fifth period of the B cycle is an interleaved wait period for pointer generation. The pointers are combined with S1 and S2 for error correction purposes as set forth in Hinz, Jr., supra. Pointer generation can be in a fixed delay determined by circuit design parameters beyond the scope of the present description. Timing periods B6-B7 are not used for any function in connection with the present invention.

The AB cycle is entered automatically unless it is aborted by skip AB circuit 353, for example. Circuit 353 responds to an error-free condition (such as S1=S2=0) to supply the GO ABC signal over line 354 to the FIG. 5 illustrated timing controls. Depending upon the error correction code selected for use with the present inventive apparatus and methods, the AB cycle may be omitted under certain error conditions, the description of which is beyond the present disclosure. The second entry into ABC cycle is from the AB cycle indicated by timing signal AB-7 traveling through OR circuit 355 to line 354.

It is also preferred that a selected error correction code also be capable of indicating uncorrectable errors, that is, errors existing beyond the code's correction capability. Circuits 365 receive several inputs as shown in FIG. 6 and employ logic dependent on the selected error correction code to indicate such errors by supplying signals over lines 372 and 390 to microprocessor 38. Since the logic functions and arrangements are error code dependent and not a part of the present invention, they are not described.

Before proceeding into the detailed description of the error correcting circuit operation, a brief overview of the error correction code is given. The error correction code operates on all record segments; each full data segment, each residual data segment, as well as each CRC or check bit segment. In all instances, the error correction code operation is identical. Each record segment consists of bytes 1–7, each byte having one bit in each of nine record tracks, plus a check bit byte with a parity or other check bit symbol in track 8. Alternatively, the rectangular data arrangement could be considered as consisting of nine bytes, one byte along each track, and each byte having eight bits or all signals in one track. For the purposes of the present discussion, the byte orientation usually found in nine-track magnetic recording systems is used. Because of the failure mode of magnetic media, errors usually occur along a given track. The selected error correction code, such as the codes referred to herein, should have the capability of identifying tracks in error (TIE's), with or without pointers as taught by Hinz, Jr., supra.

During readback, two error syndrome bytes S1 and S2 are generated. If these syndromes are both zero, an error-free condition exists in the record segment. Under unusual circumstances, there may be sufficient errors that the syndromes will be zero even though multiple errors occur. Under such circumstances, the CRC, referred to later, detects and indicates such an unusual error condition. The percentage of undetected errors by the codes used for each of the data segments is selected to be relatively small, i.e., much, much less than a fraction of one percent of the errors (note that the percentage is of the errors, not of the data bits being processed).

The error correction process may generate signals representing one TIE (track in error). Then, the detected number of pointers is combined in accordance with Hinz, Jr., supra, to indicate more than one TIE. From such information, error correction is directed to a set of circuits which then controls an Exclusive-OR screen or mask to convert bits in error to corrected bits which are then inserted into register 204 for transmittal to main buffer 43. Some of the signals generated in connection with the TIE's, as well as to the number of pointers, are transmitted to other circuits previously described to detect the fact of no errors or to detect an uncorrectable error.

Correction pointers generated in pointer circuits 197 travel over signal paths in cable 311 to TIE generator 400 which generates TIE indicator signals. Cable 401 carries these signals to ECC matrices for combining such TIE signals with S1 and S2 signals in accordance with the selected ECC. See Bossen, supra. The correction pointers on cable 311 from pointer circuits 197 also drive the correction circuitry 404 via cable 311A, as will be described.

The following description is a simplified explanation of how bits in error may be corrected. For a rigorous discussion, see either Bossen, supra, or Patel, supra.

The syndrome S1 and S2 signals respectively travel from S2 computer 339 and generator 340 to matrices 196 wherein they are combined with the TIE signals to generate binary error patterns $e_i$ and $e_j$. The eight bit $e_j$ error signal pattern is supplied to the error correction circuitry 404 for activating such circuits to correct bits in those tracks corresponding to TIE's indicated by the correction pointers. The $e_j$ signals also go to Exclusive-OR circuit 403 for being combined with S1 on a serial basis as S1 is stepped through shift register 405. This generates the $e_i$ error pattern.

When $e_j = 0$ (0 or 1 error), Exclusive-OR 403 blocks the $e_i$ pattern thereby selecting $e_j$ signals on line 402 for actuating error correction circuits 404. The $e_j$ error pattern is combined with the correction pointers in A-O's 410–417 to generate error correcting signals. On the other hand, when $j = 1$, Exclusive-OR 403 is activated to pass the $e_i$ error pattern, one error pattern bit for each segment byte 0–7. In error correction circuits 404, the i correction pointers on cable 419 selectively combine with the just-described $e_i$ error pattern for generating error correcting signals in each of A-O's 410–417. When $i = 1$, inverters 432 degate the corresponding A1 input portions of A-O's 410-417 whenever the $i$ pointer is a "1." The i pointers point to error locations combining the cable 311A correction pointers and the S2 syndrome signals on cable 52. The S2 syndrome signals and the correction pointers (indicating track in error) are combined as described by Bossen, supra, or in the alternative as described by Patel, supra. The error correcting signals also travel over cable 318 to pointer circuits 197.

Turning now to error correction itself, A-O's 410–417 (one for each track 0–7) respectively responds to the $e_j$ and $e_i$ 8-bit patterns and the pointer signals on cable 311A, the $e_i$ signals received over cable 419 to correct errors in each record segment. To this end, Exclusive-OR circuits 420–427 (202 in FIG. 4) are jointly responsive to the A-O's 410–417 supplied error correcting signal, respectively, and the data bits from segment buffer 201 passed by AND circuits 430 to supply corrected data signals through register 204 to main buffer 43. AND circuits 430 are actuated to pass data signals by the ABC cycle, the ABC timing signals on line 431.

The $e_j$ and $e_i$ patterns initiate a correction action whenever a "1" is present. For example, $e_j = 0000001$, only one byte is corrected. The parity track signals are not corrected by the described apparatus. Separate correction circuits (not shown) may be employed or parity generated from the corrected data bits, as desired.

At the end of the ABC cycle, a waiting period is initiated as indicated at 335 in FIG. 7 at the left-hand portion thereof. At the onset of this wait period, an additional pulse period 07 can be added to the above-described A, B, AB, and ABC cycles to reset all circuits to a reference state. This reset action prepares the circuits for detecting and correcting errors in the next-received data segment. Additionally, for each error, the pointer counters for the respective tracks are stepped. In the event there is no error condition, the history respective track counters are advanced; and if there is an error condition, the persistent pointer counter is stepped for defining persistent pointers. Additionally, the S1-S2 circuits in 195, as well as latches 395 and 393, are reset by a reset ECC signal (07).

The above abbreviated description relates to error detecting and correcting action for each full data, residual, and check bit segment. Additionally, the CRC actions are more fully described later with respect to FIG. 8.

In the event pointer circuits 195 indicate more than one TIE and cable 311 does not carry two correction pointer signals, "hardware" pointers (these pointers indicate present low-signal amplitude only) are requested at B5 by a signal on line 312 which travels to pointer circuits 197. Count pointer circuit 391 determines the number of pointer signals received over cable 311. Circuit 391 can be a decoding circuit array yielding two output signals, one on line 392 indicating the number of pointer signals is other than two and a second signal on line 393 indicating three or more pointer signals -- a possible uncorrectable error condition. The first signal on line 392 is compared with the detected multiple track error condition signal on line 395 from matrices 196 at time B5 by AND circuit 394. If multiple errors are indicated and there are two correction pointers, AND 394 is inactive to indicate a readily error correctable condition. No hardware pointers are gated. When there is one correction pointer signal, the particular selected code cannot correct the multiple track error -- it needs two correction pointers. Then, AND 394 sets GHP (gate hardware pointer) latch 396 to send the line 312 signal. This action is an attempt to find two pointer signals to enable error correction activity. If there are three or more correction pointers, the particular selected code also cannot correct the errors -- it needs two and only two pointer signals for multiple track error correction. Gating the hardware pointers may enable two pointers to be used. That is, the hardware pointers indicate present possible error conditions -- thereby gating the hardware pointers adds additional pointer signals to the pointer signals usually used which are derived from analysis of previously processed signals.

Depending on design choices in circuits 365, the line 393 signal indicating three or more error pointer signals may abort the read operation, effect a single TIE correction, or other error handling action as may seem appropriate. It is to be understood that the above description is greatly simplified, the description being only that complete to show a relationship between error correcting operations and operations performed by the inventive apparatus and methods.

CRC CIRCUITS

Two CRC's, CRC-1 and CRC-2, are used both during recording and readback operations. FIG. 8 shows the connections in simplified form of CRC elements for effecting CRC error detection during both recording and readback operations. In fact, the elements are shared between the two operations; hence, the circuitry of CRC 205 shown in FIG. 4 also forms a part of the write error circuits 47 of FIG. 3. The error correcting code ECC is not shown in FIG. 8 for simplifying the presentation. Elements of the data transfer path are shown for more clearly illustrating the functional interrelationships, those elements bearing the same numerals as used in other figures. Additionally, CRC elements verify proper circuit operations during both recording and readback.

The various circuits shown in FIG. 8 are used for multiple purposes. Some of the circuits are used both for generating check bit residues to be recorded with the data and/or to be used verifying appropriate proper readback of data from the tape, respectively, during the record or readback modes and also to verify proper hardware operation. Inspection of the table below will show these relationships:

| CRC CIRCUIT(S) | RECORDER MODE | USAGE |
|---|---|---|
| 1A | Record RLL, NRZI | Generates Check Bit Residue |
| 1B | Read RLL, NRZI | Checks Recorded Check Bit Residue |
| 2A | Record RLL | Generates Check Bit Residue |
| 2C | Read Backward RLL | Checks Recorded Check Bit Residue |
| 2A & 2B | Record — ALL | MB 43 Operation |
| 2A & 2B | Read Backward — ALL | " |
| 2A & 2B | Read Forward — RLL | " |
| 2B & 2C | Record PE, NRZI | Read After Write (Verifies Recording) |
| 2B & 2D | Record RLL | Read After Write (Verifies Recording) |
| 2B & 2D | Read Forward RLL | Checks Recorded Check Bit Residue |

Note that MB 43 operation is verified for read forward RLL separate from all other checks. The reason for this is that the data in the residual and check bit frames is loaded into MB 43 before it is known whether or not such subsystem internal data and control signals are present. That is, the length of the record is unknown; hence, it cannot be determined until after the data has been loaded into MB 43 until after it actually has been transferred. In the read backward mode, the location of such control signals is known and can be inhibited from transfer to MB 43. The term NRZI indicates recording in the American Standard NRZI nine-track format. That recording and readback mode is not described herein. It is listed on the table to show applicability of the FIG. 8 illustrated circuits for a third record format.

During an RLL recording operation, CRC-1A and CRC-2B circuits generate check bit fields or residues based upon data signals transferred from main buffer 43 to group buffer 45. CRC-1A circuits also receive the pad bytes received in accordance with the FIG. 8 illustration. CRC-2A circuits, on the other hand, generate the CRC-2 check bit field based upon the data bytes transferred from A-O's 462 to main buffer 43 (without the pad bytes). CRC-2B circuits generate a second CRC-2 check bit field based upon the data bytes transferred from main buffer 43.

Accordingly, any difference between the two CRC-2 check bit fields (CRC-2A and CRC-2B circuits) indicates an error condition in main buffer 43.

During RLL readback, of course, a complementary connection is made to ensure proper matching of the CRC-1 and CRC-2 check bit fields generated during readback with respect to those recorded with data signals. During RLL record, CRC-1A circuits 600 receive data bytes from main buffer 43 via OR's 601. The output of gating logic 44 could be routed directly to OR's 601.

During RLL record, while generating the RLL terminating portion, both the CRC-1A and CRC-2A check bit fields are gated to group buffer 45. CRC-2A from circuits is first gated in the byte seven position of the residual data segment. AND circuits A1 of A-O's 611 pass the CRC-2A check bit segment in joint response to the B7 timing pulse from the FIG. 5 illustrated apparatus and the gate CRC-2 signal received over line 610 from write circuits 46. Check bit field of CRC-2A also goes through OR's 601 into CRC-1A circuits 600. The CRC-1 check bit field generated by CRC-1A circuits 600 travels through group buffer 45 for recording the check bit segment, as above described. To this end, the gate CRC-1 signal received over line 137 from write circuits 46 opens AND 611 to repeatedly supply the CRC-1 check bit fields to group buffer 45.

CRC-2A circuits and the CRC-2B circuits 606 are used during the phase-encoded readback mode for verifying proper MB 43 buffering operations. Firstly, during the RLL mode, the data bytes from register 204 travel through AND/OR's 462 to CRC-1B; that is, the data bytes are on the "media side" of main buffer 43 in the same manner as the original CRC-1 check byte field was generated on the media side of main buffer 43 during recording. CRC-2B receives the data bytes as transferred from main buffer 43 to scan buffer 40.

Operation of the CRC circuits is in accordance with U. S. Pat. No. 3,508,194. In selected instances, CRC-2B and CRC-1B, the residue and the data being checked are both inputted to the CRC circuit. Upon completion of readback, a predetermined reference or match pattern remains. This match pattern (MP) drives compares 4 and 5 to determine proper readback. In the other instances, compares 1–3, two generated residues for each compare circuit, are compared for equality. If equal, no error; if unequal, an error is indicated.

Recorded CRC-2 residue has its parity position numerical content changed in accordance with the MOD 7 residual count being odd or even. Accordingly, CRC-2C and CRC-2D circuits have associated Exclusive-OR's 634 and 635 for accommodating this change. Exclusive-OR 634 jointly responds to the $2^0$ bit position of the recorded MOD 7 residual count and the parity bit position (track 8) of the CRC-2 recorded byte to input the correct binary value to CRC-2C. AND 636 allows this action to affect CRC-2C only during backward read in the RLL mode. Exclusive-OR 635 modifies the CRC-2D generated residue in accordance with the above rules for compare with the CRC-2B supplied residue based upon the recorded CRC-2 residue.

AND/OR 637 selectively gates the compare results in accordance with the CRC table above to AND 638. AND 638 gates a CRC ERROR signal to microprocessor 38 in response to the test error signal from microprocessor 38 at EOD. Such signal is then forwarded to a connected CPU (not shown) as part of final status. Errors detected by compare 1 are forwarded to microprocessor 38 during write mode, read backward, or read forward and $\overline{RLL}$ (see A-O 639) by AND's 640.

FIG. 8 and the above logic description has avoided description of detailed timing of the CRC circuits. That is, each CRC circuit includes input gating (not shown) timed in a known manner for entering the signals checked by such circuits in accordance with the illustrated format and the CRC table. These timing control circuits have been omitted for simplifying the presentation.

While the invention has been particularly shown and described with reference to a preferred embodiment thereof, it will be understood by those skilled in the art that various changes in form and detail may be made therein without departing from the spirit and scope of the invention.

What is claimed is:

1. The improved method of detecting and correcting errors in data signals being transferred, including the following steps in combination:

providing first and second error checking and correcting codes, said first code having a greater error correction capacity than said second code;

dividing said data signals into a plurality of segments, each segment having a fixed number of bits;

independently applying said first code to each said segment, generating separate code check bit fields for each segment;

applying said second code to all said data signals to generate a second code check bit field;

using said second code check bit field as one of said segments such that said first code can correct errors in said second code check bit field; and verifying the error correction operation of said first code by said corrected second code check bit field.

2. The method set forth in claim 1 further including recording said data signals and said associated code check bit fields of said first code and the second code check bit field on a magnetic record media;

sensing the recorded signals immediately after recording same; and then comparing the error corrected readback signals with the original data for verifying proper recording operations.

3. The method set forth in claim 2 further including the following steps in combination:

selecting a multitrack record media and a multitrack transducer with associated multitrack signal processing circuits for transferring signals between a media and such circuits;

dividing said segments among the various tracks in said multitrack record and applying said error correction codes to said data signals in different code-to-data-signal permutations, and including applying a first code to the data signals in the respective segments in a first manner and applying said second code on all of said segments in a different manner.

4. The method set forth in claim 1 further generating a third check bit field by applying an additional error correction code to all of said segments and in a different manner than said second error correction code for further verifying operation of said first error correction code and error correcting said third check bit field by said first code.

5. The method set forth in claim 4 for burst error detection and correction, applying said first code for correcting burst errors, and applying said second and third codes in significantly mathematically different manners for detecting miscorrected burst errors.

6. A digital magnetic recorder having signal processing means for exchanging signals with a record medium via a transducer, the improved recorder including in combination:

first means in said signal processing means for dividing signals exchanged with said medium into a plurality of segments;

first error detection and correction means receiving signals from respective segments and generating check bit residues in accordance with the data permutations in the respective segments, and said signal processing means exchanging said residue signals with said respective segment data signals as a set of signals with said media;

second error detection means receiving data signals from all of said segments being exchanged with said medium and generating a second check bit residue in accordance with the data permutations thereof; and said signal processing means further including means receiving said second check bit residues and supplying same to said first error detection and correction means as a set of data signals of one segment such that said first error detection and correction means operates on said second check bit residue to correct same.

7. Error detection and correction apparatus for detecting and correcting errors in a set of data signals, the improved apparatus including in combination:

means dividing said data signals into plural segments, each said segment having a fixed number of signals;

a first error detecting and correcting means receiving said data signals in successive segments and generating a first check bit residue for each said segment;

a second error detecting means receiving said data signals irrespective of said segment division and generating a second check bit residue in accordance with said data signals; and means receiving all said data signals for generating a check bit segment including said second check bit residue and supplying same to said first means.

* * * * *